Oct. 29, 1940.   H. SCHOEPE   2,219,944
THREADING AND CUTTING MACHINE
Filed Oct. 2, 1939   3 Sheets-Sheet 1

INVENTOR.
HARRY SCHOEPE.
BY Robert W. Wilson
ATTORNEY.

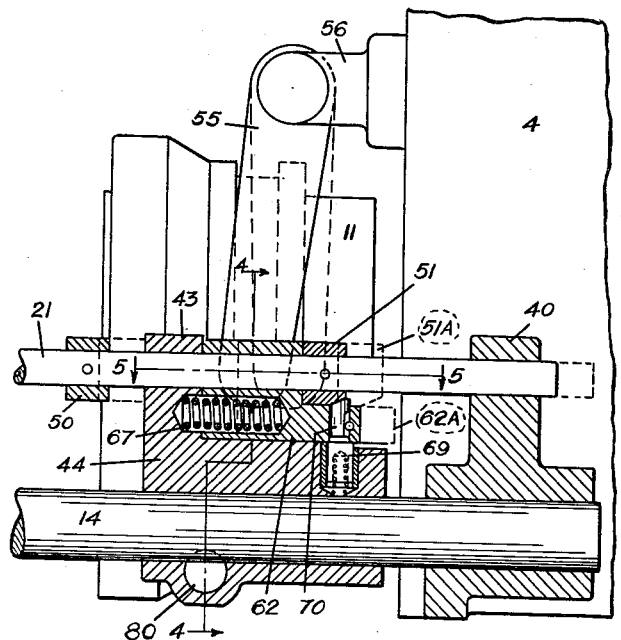
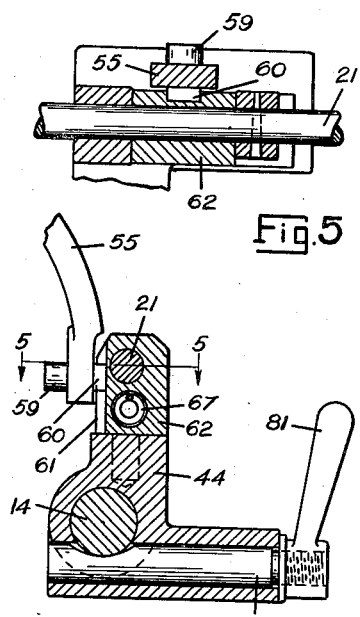
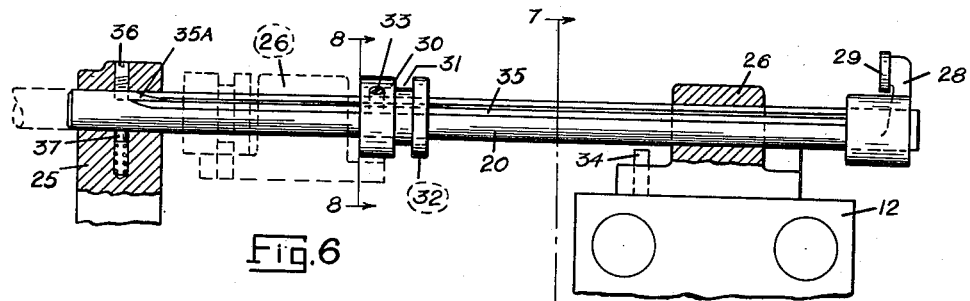
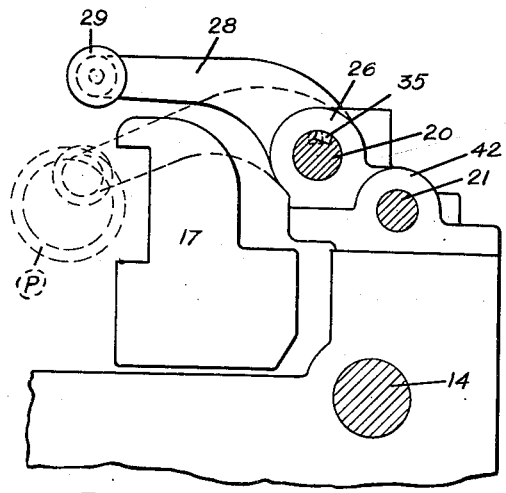
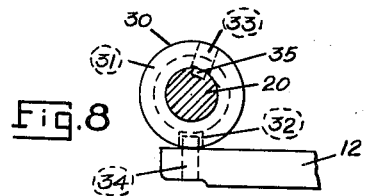
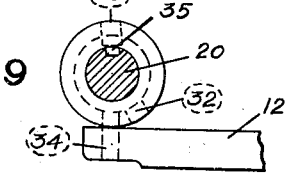
INVENTOR.
HARRY SCHOEPE.
BY Robert W. Wilson
ATTORNEY.

Oct. 29, 1940.    H. SCHOEPE    2,219,944
THREADING AND CUTTING MACHINE
Filed Oct. 2, 1939    3 Sheets-Sheet 3

INVENTOR.
HARRY SCHOEPE
BY Robert W. Wilson
ATTORNEY.

Patented Oct. 29, 1940

2,219,944

UNITED STATES PATENT OFFICE 2,219,944

THREADING AND CUTTING MACHINE

Harry Schoepe, Cleveland, Ohio, assignor to The Oster Manufacturing Company, Cleveland, Ohio, a corporation of Ohio Application October 2, 1939, Serial No. 297,552

14 Claims. (Cl. 10—89)

This invention relates to a threading machine with various improved features for adjustment, for tripping and resetting, for positioning stock and related purposes, as will appear from the succeeding description. The particular machine is shown as involving a tangential die head, although certain of the improved features could equally well be applied to other types of die heads.

Specifically, the purposes of the invention are to provide improvements in respect to:

A stock carrying carriage and stock stop to position the rod or pipe stock to be threaded, which automatically removes itself from the line of travel of the stock when the carriage is moved towards the die head, and replaces itself when the carriage is retracted; improved means for mounting the dies in the die head and for governing the depth of cut within predetermined limits, so that either deep, standard or shallow cuts, and either roughing or finishing cuts can be made for any given thread size within the range of the die head, and can be accurately repeated for each cut, not being disturbed by opening and closing of the dies; an automatic tripping and resetting device for the die head, operable by carriage movement and adjustable for lengths of threading to be done; and in general to provide a rapid, compact, accurate, sturdy and simple threading machine. Further purposes are the provision of an improved die head per se, with simplified and otherwise improved means for fastening the dies and for moving them in and out of engagement with the work. Further advantages and possibilities of the invention will appear as the description proceeds. It is understood that in the accompanying drawings and in the description which follows, the purpose is to disclose in detail a preferred form of the invention, without limiting the invention thereto, inasmuch as various changes and modifications may be resorted to without departing from the spirit of the invention.

In the accompanying drawings

Fig. 3 is a vertical section on plane 3—3, Fig. 1, with some parts in elevation, showing trip mechanism;

Fig. 4 is a transverse vertical section through the trip mechanism, on plane 4—4 of Fig. 3, with some parts in elevation;

Fig. 5 is a detail of the trip mechanism in horizontal section, on plane 5—5 of Figs. 3 and 4, with some parts in plan;

Fig. 6 is a longitudinal vertical section through the stock stop mechanism, on plane 6—6 of Fig. 2, with parts in elevation;

Fig. 7 is a transverse vertical section through the stock stop mechanism, on plane 7—7 of Fig. 6, with parts in elevation;

Fig. 8 is a transverse vertical section through the stock stop operating rod, on plane 8—8 of Fig. 6, in the position of parts when the stop is up;

Fig. 9 is the same view as Fig. 8, but showing parts when stop is down;

Figure 1:
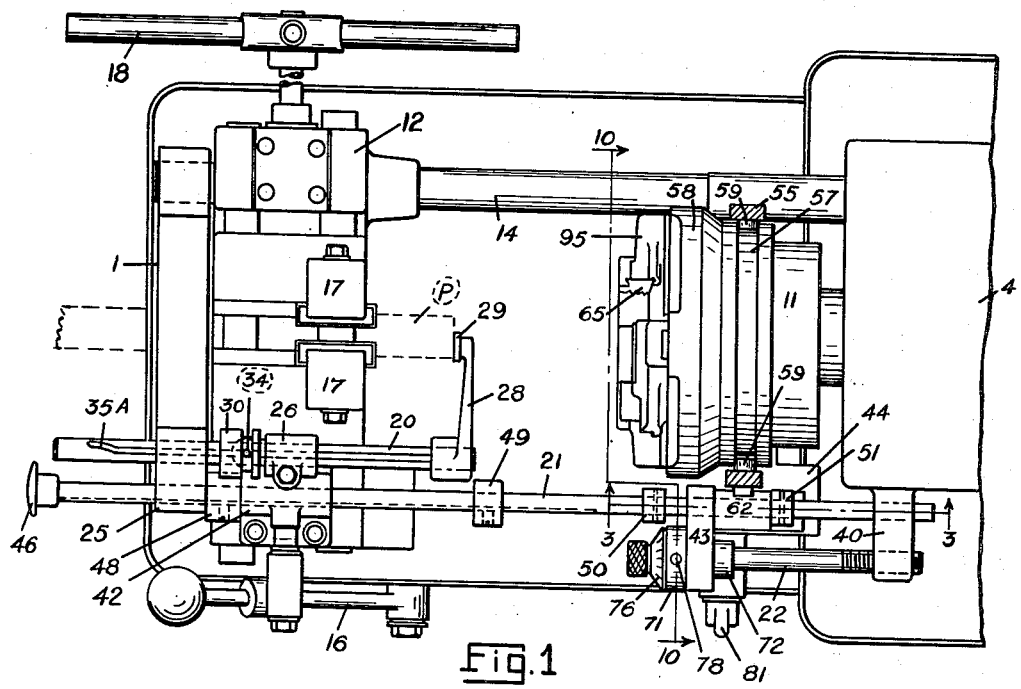
Fig. 1 is a plan view of my improved machine showing stock in the vise, and the carriage retracted.
Figure 2:
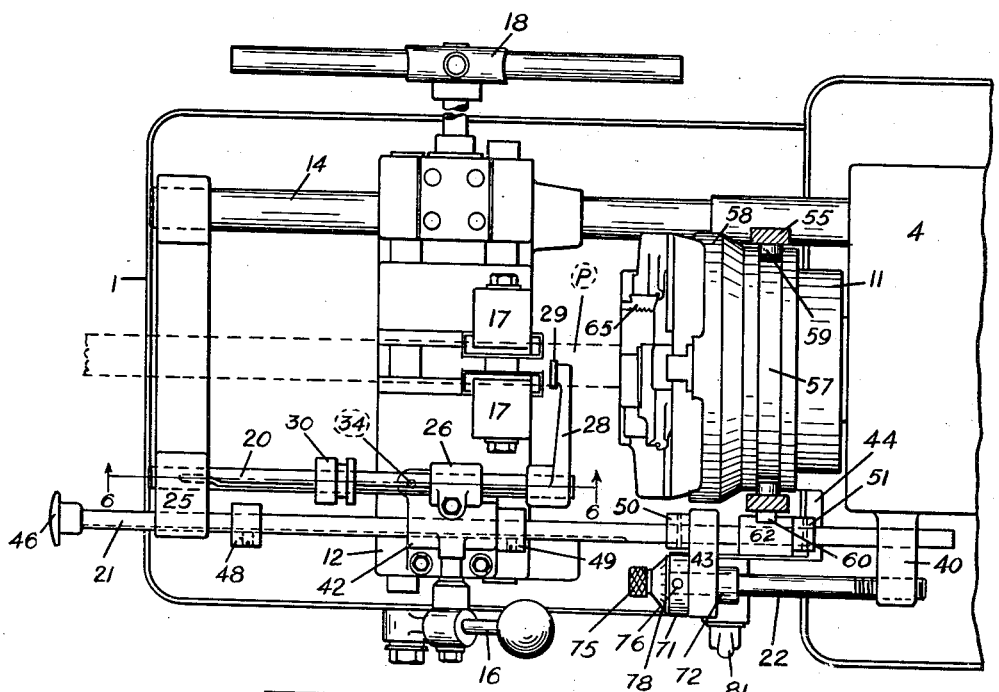
Fig. 2 is a corresponding view showing the carriage moved up with the stock ready for threading.

As best seen in Figs. 1 and 2 the machine is of a type having a die head driven by mechanism not shown, such die head being rotatable, but fixed in position axially, and a travelling carriage 12 movable toward and from said die head 11 upon studs or ways 14 by means of a lever 16. The vise includes the usual jaws 17 opened and closed by a hand wheel 18.

Figure 10:
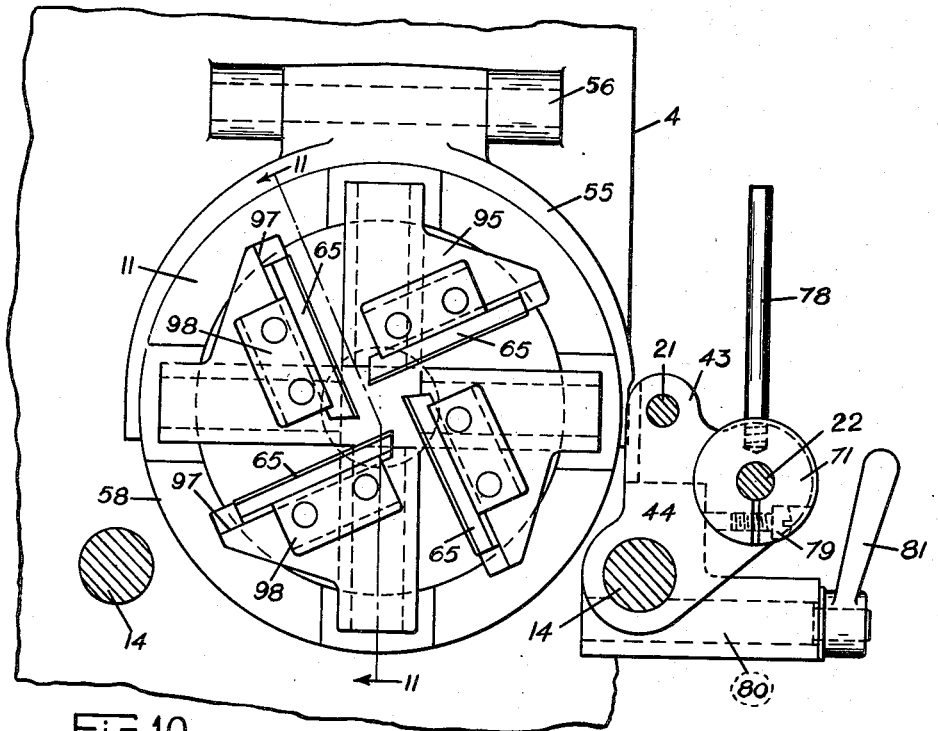
Fig. 10 is a front elevation of the die head and trip bracket, on the plane 10—10 of Fig. 1.

In the particular machine illustrated the die head is of the tangential type, shown in detail in Fig. 10, although many features of the invention might be applied to a machine with any rotating die head.

Connections between the carriage, the stock stop and the die head are by three rods parallel to the guide studs, placed on the operator's right (bottom of the page, Figs. 1 and 2). These are respectively a stop stock rod 20, a trip rod 21 and an adjusting bolt 22 for the trip mechanism. The novel inter-relation of these predetermines the dimensions of the thread cut.

Stock stop

The stock stop mechanism is illustrated in Figs. 1, 2 and 6 to 9 inclusive. It comprises the rod 20, having limited axial and limited rotary movement in and through an ear 25 on the machine frame, and a lug 26 on the carriage 12. A finger 28, with a button 29 on its outer end, is fast to the forward end of rod 20 and is movable from the dotted (stopping) to the solid (clear) position of Fig. 7, by turning of the rod. When the parts are in the clear position the jaws 17 can pass under the finger 28, as apparent from Fig. 7. A collar 30, circumferentially grooved at 31, and having a notch 32 leading only from its forward face into said groove, is fastened to the rod 20 against either axial or rotary movement by a set screw 33. A stud 34 on the carriage 12 enters groove 31 through notch 32 when rod 20 is in the position of Fig. 8 (the position where button 29 clears the stock), and thus carries rod 20 back with carriage. When the rod turns to the stock-stopping position of Fig. 9 notch 32 gets out of registry with stud 34 and the rod 20 is thus secured for forward axial movement with the carriage, as shown in dotted lines in Figs. 6 and 7. The rod 20 has a straight groove 35 along nearly all its length, and the groove is cammed near the end at 35A, stopping at the outer end of the cam. This groove rides a stud 36 in the ear 25, and some drag is applied to the rod by a small spring-pressed block 37.

The purpose of the stock stop is of course to gauge the amount of pipe P projecting forward of the jaws 17 to be threaded; see Fig. 1. The distance of the finger 28 ahead of the jaws is set by locating the collar 30 on the rod 20. The stock stop is so related to the carriage that the operator is required only to insert the stock up until it touches the stop, and then slide the carriage forward into working position by the lever 16, when the stop automatically lifts itself out of the way, and the relation with the trip mechanism is such that when the proper amount of thread has been cut, the thread cutting will stop itself automatically. The action in detail will be described later.

Trip

The trip mechanism, Figs. 1 to 5 inclusive, includes the trip rod 21 supported near its respective ends for axial movement in ear 25 on the front of the machine bed 1 and ear 40 on the gear housing 4, and passing through a lug 42 on carriage 12 and through an ear 43 on the trip bracket 44. The rod 21 has a hand grip 46 for manual operation; the rod 21 also carries collars 48 and 49 which can be set at desired positions along the rod for engagement with the carriage lug 42. In addition, the rod 21 carries a stop collar 50 and a trip collar 51. Collars 48 and 49 may be held anywhere along the trip rod, within operative range, by set screws, but collars 50 and 51 which work the trip mechanism, Fig. 3, are pinned to the rod and are not adjustable.

The principal parts of the trip mechanism, Figs. 3 to 5, are connected to the die head through a yoke 55, hinged to the gear housing 4 at 56, and engaging a groove 57 in the die head ring 58 by studs 59. Another stud 60 is guided in a groove 61 in a trip block 62 which has a limited movement with respect to the trip bracket 44, and carries yoke 55 with it in such movement, thus opening and closing the die head, as will later be explained.

The movement of the trip block 62 relative to the bracket 44 is between the solid line position and the dotted line position 62A, of Fig. 3. At the beginning of an operating cycle, when the yoke 55 is in the solid line position of Fig. 3 and the dies 65 are consequently closed, the trip block 62 is at the left limit of movement, and the tripping spring 67, having its ends seated respectively in bores in the bracket 44 and block 62 is compressed. A spring-raised vertical detent 69 having a shouldered nose is up, with the nose bearing on the bottom of a trip plunger 70, having an inclined upper end. Thus the nose locks the trip block in place. The plunger end engages a complementary slope on trip collar 51, fast to the rod, with the result that rightward movement of the trip rod, taking the collar to the dotted position 51A, depresses the plunger 70, pushes the nose of 69 out of the plunger bore and allows the spring 67 to snap the block 62 to the position 62A, thus opening the dies 65. Stop collar 50 prevents trip collar 51 from riding off the flat of trip plunger 70; thus retraction of rod 21 resets trip block 62.

Setting of the collar 49 along rod 21 of course controls the length of the work P threaded before the dies snap open. The mechanism can be set for short work, eliminating the need to retract carriage 12 fully, by setting collar 48 an appropriate distance to the right, Figs. 1 and 2. The hand grip 46 allows manual opening or closing of the dies at any time.

Adjustments

The extent to which the dies 65 close is subject to two adjustments, by mechanism shown in Figs. 1, 2 and 10, which mechanism acts upon the range in which movement of the trip block 62 occurs, and thus governs the radial distance of inward travel of the dies. The chasers are changed or set in or out in their holders, according to whether they are radial or tangential, for different sizes of stock to be threaded. The two adjustments accomplished by the mechanism of the present invention are for depth of cut, shallow, standard or deep, and for roughing or finishing cut on stock requiring two passes.

Ear 43 on the trip bracket 44 is engaged between a split washer 71 and a collar 72, both on adjusting bolt 22. Bolt 22 is threaded on its end remote from 70 and 71 through ear 40 on the housing 4. It can be screwed in and out by a knurled head 75 which is fitted with an index dial 76 and it can also be given a partial turn by a handle 78 on washer 71, when the washer is set tight by clamp screw 79.

Having set the dies for the stock size to be worked, the operator loosens the washer 71, and turns head 75 until the index dial 76 is set for whatever depth of cut he wishes. This of course moves the bolt 22 in or out by its screw threads, and thus traverses the trip bracket 44 a slight distance along the way 14, so establishing the solid line position of yoke 55, which determines the closed setting of the dies 65. The washer 70 is then clamped with handle 78 vertical.

If a roughing cut is to be taken, the handle 78 is moved clockwise in Fig. 10, thus moving the train of mechanism to spread the dies slightly in their closed position, and for the corresponding finish cut 78 is returned to the vertical. Obviously no readjustment at 76 is required, because the rough or finish adjustment has carried the basic setting of 76 with it.

To give added stability in holding the trip bracket 44 stationary while the trip block 62 moves, the bracket can be locked to the way 14 by a binder bolt 80, clamped by a handle 81. The handle 81 is of course released while adjustments are being made at the head 75, and while the handle 78 is being turned between roughing and finishing positions. When the binder bolt 80 is not clamped, the adjusting rod 22 and associated parts prevent movement of the trip bracket 44; the bolt 80 can be used to take the load off the rod 22.

Die head

Figure 12:
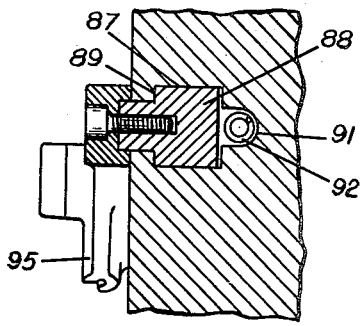
Fig. 12 is a longitudinal horizontal section on the plane 12—12 of Fig. 11, showing a detail of a die mounting.
Figure 11:
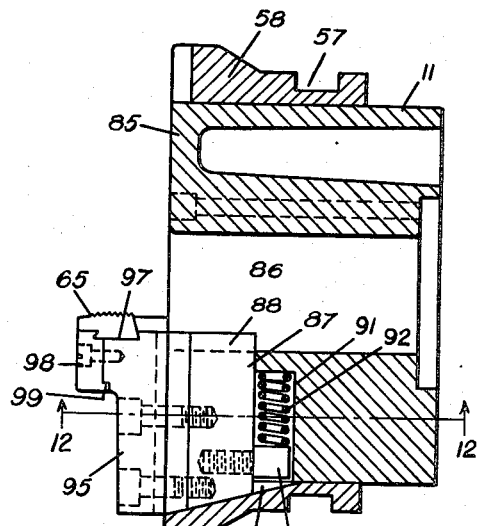
Fig. 11 is a longitudinal central section through the die head, on the plane 11—11 of Fig. 10.

The details of the die head are shown in Figs. 10, 11 and 12. The die head body 85 is of generally conventional construction, with connections, not shown, to a driving motor under the housing 4. The body is centrally apertured at 86 for passage of stock, and radially slotted as at 87 for movement of the die holder slides 88, which are of T-shape in transverse section, Fig. 12, guided in the slots, but seating only upon front shoulders 89, so that the depth of the slot may be in excess of that required, and only the shoulders 89 have to be cut accurately. The slot bottoms are further hollowed out at 91 to receive compression springs 92 which bear upon screw heads 93 in the slides 88 and urge the entire die slide organization outward. The outer ends of the slides 88 are inclined as shown and bear upon correspondingly outwardly and forwardly tapered bottoms of corresponding grooves 94 in the inner surface of the die head ring 58, such ring being axially movable upon the body 85 by the yoke 55. Thus leftward movement of the ring moves the die slides inward, compressing the springs 92 and closing the dies 65. The springs move the slides outward and open the dies as the ring 58 is moved to the right.

The slides 88 are capped by die holders 95, removably secured to the narrow ribs of their several slides 88, and bearing upon the face of the die body opposite the shoulders 89 so that in effect the complete die holder assembly has edge grooves gibbed to each front edge of the slot 87. Thus any single die holder assembly can be removed by itself from the head, by taking off the holder proper 95, retracting the ring 58 and pulling out the slide 88 radially. The slide 88 and holder 95 collectively constitute a die carrier.

The die holders 95 are of somewhat triangular outline in face view, Fig. 10, each with a long edge 97 tangential to the pipe and undercut or dovetailed at its inner edge, to seat the correspondingly shaped back of the die 65, as seen in Fig. 11. Clamps 98 are screwed to the holders 95 and also dovetailed so that the holding effect is accomplished as best seen in Fig. 11. The die clamps 98 are also tongued to the die holders as at 99, but do not have to seat accurately, since all accuracy in seating is accomplished by the dovetail groove on the die holder. It is apparent that by loosening its clamp holding screws any one of the dies 65 may be adjusted, removed or replaced without disturbing any other.

Operation

In detail the mechanical action is as follows. Assuming the carriage to be in the back position, Fig. 1, the stock stop will be down, (dotted lines, Fig. 7), due to the slot 35 riding the stud 36 in the ear 25. The stud 34 on the carriage will be in the groove 31 of the collar 30, and the distance the button 29 is ahead of the jaws 17 will depend upon where the collar 30 is set along the rod 20. The notch 32 in the front flange of collar 30 is out of registry with the stud 34, so that the stud cannot escape from the groove 31. The operator introduces the stock P between the jaws 17 until its end strikes the button 29, then closes the jaws by the wheel 18. If a roughing cut is to be taken he sets the handle 78 in its down position. He next moves the carriage 12 forward by the lever 16. The forward movement of the carriage pulls the stock stop rod 20 forward by engagement of the stud 34 with front flange of collar 30, (see Fig. 9), until the camming part 35A of slot 35 rides stud 36, which rotates rod 20, lifting finger 28 away from the stock end, and also allowing stud 34 to clear notch 32 so that when rod 20 stops carriage 12 can keep on going.

The stock P is now engaged by the dies 65 which pull it along, with carriage 12, as they cut the thread. As soon as lug 42 on the carriage picks up collar 49 the trip rod 21 starts forward, and soon the trip collar 51 releases the latch at 69, the trip block 62 jumps forward and the dies 65 open, which of course stops the feed. Thus the length of stock threaded is determined by the position at which collar 49 is fastened along the trip rod 20. If a short piece of stock, a nipple for example, is to be threaded, the jaws can pass under the finger 28 (see Fig. 7), but the collar 49 can never be set far enough forward on the trip rod to allow the jaws 17 to come into contact with the die head. The slot in which collar set screw moves is short enough (Figs. 1 and 2) to prevent this.

If the cut has been for roughing only the operator retracts the carriage, turns adjustment handle 78 up, and runs the stock through again. If a final cut has been finished he releases the jaws 17, removes the stock P and runs the carriage back to the position of Fig. 1, which travel automatically resets the stop finger 28 and the trip block 62.

From the foregoing it will be seen that this invention provides a threading machine of compact and simple construction, operable by a minimum number of motions, readily set for length of cut and dept of thread for any given stock diameter, having all parts readily accessible for setting, having all movements of the operating cycle caused by travel of the work-carriage, having the various settings communicated to the dies without requiring additional parts or further complexity in the die head per se. The invention further provides mechanism free from manufacturing difficulties, securing accurate results without the use of parts having unusual shapes or exceptionally accurate construction or finish, and minimizing operating wear on members which give the close adjustments. As to the die head per se, a high degree of accessibility for maintenance, adjustment, removal of parts, and repair is given by the features of this invention.

It will be understood that the foregoing description of a preferred form, with illustrative drawings, is intended by way of example, not of limitation, and that the scope of the invention is defined by the following claims.

I claim:

1. A threading machine comprising in combination a frame, a die head with movable dies therein, a carriage movable toward and from said die head, a work holder on said carriage, a stock stop associated with said carriage and work holder and movable between operative and inoperative position by movement of said carriage, and means for moving said dies between open and closed position by movement of said carriage.

2. A threading machine comprising in combination a frame, a die head with movable dies therein, a carriage movable toward and from said die head, a work holder on said carriage, a stock stop associated with said carriage and work holder and movable between operative and inoperative position by movement of said carriage, said stock stop comprising a rod mounted parallel to the direction of carriage movement, a finger fixed to said rod and having a free end adapted to reach in front of said work holder, and connections between said rod and said carriage for moving said rod axially with part only of the carriage travel and for concurrently swinging said finger into and out of line with said work holder.

3. A threading machine comprising in combination a frame, a die head with movable dies therein, a carriage movable toward and from said die head, a work holder on said carriage, a stock stop associated with said carriage and work holder and movable between operative and inoperative position by movement of said carriage, said stock stop comprising a rod mounted parallel to the direction of carriage movement; connections engageable between said carriage and said rod for moving said rod with said carriage away from said die head and with said carriage toward said die head when said rod is in certain rotary position only; and connections between said rod and the machine frame for changing the rotary position of said rod during the axial movement of the rod.

4. A threading machine comprising in combination a frame, a die head with movable dies therein, a carriage movable toward and from said die head, a work holder on said carriage, a stock stop associated with said carriage and work holder and movable between operative and inoperative position by movement of said carriage, said stock stop comprising a rod mounted parallel to the direction of carriage movement, a finger fixed to said rod and having a free end adapted to swing to and from a position in front of said work holder, and connections between said rod and said carriage and between said rod and said machine frame for moving said finger with said carriage, for swinging said finger away from said work holder as said carriage approaches said die head and for stopping movement of said finger with said carriage after said finger is swung away, allowing the work holder to pass under said finger.

5. A threading machine comprising in combination a frame, a die head with movable dies therein, a carriage movable toward and from said die head, a work holder on said carriage, a stock stop associated with said carriage and work holder and movable between operative and inoperative position by movement of said carriage, said stock stop comprising a rod mounted parallel to the direction of carriage movement, a finger fixed to said rod and having a free end adapted to swing to and from a position in front of said work holder, and connections between said rod and said carriage and between said rod and said machine frame for moving said finger with said carriage for swinging said finger away from said work holder as said carriage approaches said die head, for stopping movement of said finger with said carriage after said finger is swung away, and for swinging said finger in front of said work holder as said carriage recedes from said die head.

6. A threading machine comprising in combination a frame, a die head with movable dies therein, a carriage movable toward and from said die head, a work holder on said carriage, a stock stop associated with said carriage and work holder and movable between operative and inoperative position by movement of said carriage, said stock stop including a finger having a free end adapted to swing to and from a position in front of said work holder, and connections between said carriage, said finger, and said machine frame adapted to swing said arm from such position as the carriage approaches the die head and back to such position as the carriage recedes from the die head.

7. In a threading machine comprising a threading tool and stock holding elements movable toward and from said tool; a stock stop for limiting the position of stock on its introduction to said holding elements, said stop comprising in combination a rod parallel to the path of said holding elements, a finger fixed to one end of said rod and movable into and out of the path of the stock, a longitudinal groove in said rod, said groove being straight for the greater part of its length and curved near one end, a stationary guide engaging said groove, a circumferentially grooved collar selectively fixed upon said rod, a stud movable with the stock holding elements, a notch in said collar giving passage to said stud into said circumferential groove only when said finger is out of the path of the stock, whereby the motion of the stock is imparted to said rod and finger so long as the finger is in the path of the stock and ceases to be imparted thereto when the finger is moved from the path of the stock.

8. A threading machine comprising in combination a frame, a die head with movable dies, a work holding carriage movable toward and from said die head, and a trip mechanism associated with said carriage and said die head, said trip mechanism comprising a rod parallel to the line of travel of said carriage, stops on said rod engageable with said carriage to impart a portion of the carriage movement to said rod, a bracket and a block slidable thereon, a spring compressed by travel of said block in one direction, a detent connecting said bracket and block in spring-compressed position, a collar on said rod engaging with said detent and including an inclined edge to move said detent out of engaging position and thereby allow said spring to snap said block away from said bracket, and an edge to hold said detent out of engaging position until said block is returned to spring-compressed position, said collar contacting said block on return movement of said carriage to return the block to spring-compressed position and to allow said detent to re-engage said block, a second collar positioned on said rod to engage said block and thereby prevent over-travel of said first-named collar, and an operative connection between said trip block and said die head.

9. A threading machine comprising in combination a frame, a die head, a carriage movable toward and from said die head, a stock holder on said carriage, and a stock stop, said stock stop comprising a rod mounted parallel to but offset from the axis of the stock for limited pivotal and longitudinal movement in said frame and said carriage and a finger inwardly directed on the said rod between said die head and said carriage, means associated with said carriage effective during the initial part of the carriage movement towards the die head to carry said stock stop longitudinally with the carriage, means associated with the frame effective during an intermediate part of the carriage movement to effect limited rotation of said stock stop thereby removing said finger from alignment with the stock and thereafter to prevent further longitudinal movement of the stock stop while allowing further movement of the carriage, and means to adjust said stock stop carrying means to predetermine the initial distance between the stock holder and said finger.

10. A threading machine comprising in combination a frame, a die head, a stock carriage, a stock stop associated with said frame and said carriage, and trip mechanism for said die head associated with said carriage, elements on said stop for moving same into and out of stopping position with movement of said carriage, and elements on said trip mechanism for relating the tripping and resetting of the die head to movement of the carriage.

11. A threading machine comprising in combination a frame, a die head with movable dies, a work holding carriage movable toward and from said die head, and a trip mechanism associated with said carriage and said die head, said trip mechanism comprising a rod parallel to the line of travel of said carriage, stops on said rod engageable with said carriage to impart a portion of the carriage movement to said rod, a block, means for securing said block to the frame, a bracket connected to the die head for opening and closing the dies and having a limited motion with respect to said block, a latch connecting said block and said bracket, means urging said block from said bracket, and collars on said rod adjacent said block engageable with said latch to release said block and to return said block.

12. A threading machine comprising in combination a die head including dies, a work holding carriage, ways whereon said carriage is movable toward and from said die head, trip mechanism to open and close the dies of said head co-operable with said carriage, and adjusting means to regulate the depth of thread cut, comprising a trip bracket movable on said ways, a lock for said bracket on said ways, a spring adapted to move said block away from said bracket, a trip block adapted for limited movement on said bracket, operating connections from said block to said dies, and connections between said carriage and said block for releasing the block for movement by action of said spring, and for resetting the same.

13. In the apparatus of claim 12, adjusting means for positioning said trip bracket along its way comprising a bolt threaded to the machine frame and connected to said bracket to carry the same with axial travel of the bolt, and two means for turning said bolt, one comprising a head and index fast to the bolt, the other comprising a handle carried upon the bolt with means for selectively clamping to or releasing from said bolt, and means for limiting the swing of said handle to less than a full turn of the bolt.

14. A threading machine comprising in combination a revoluble die head, radially movable dies and holders therefor in said body and a ring slidable thereon having inwardly inclined surfaces abutting the ends of said holders whereby a horizontal movement of said ring effects the opening and closing of said dies; a carriage mounted for horizontal movement toward and from said die head and work holders thereon; horizontal rod means connecting said ring and said carriage including adjustable latching means to release said ring for sudden horizontal movement at a predetermined instant of the carriage travel; horizontally operable means to close said dies and reset said latching means at another point in said carriage travel; calibrated screw means horizontally disposed to effect a fine adjustment of one position of said ring; a stock stop horizontally movable with said carriage, and means operable by said carriage to move said stop transversely into and out of a stopping position in front of said work holders; said stock stop defining the horizontal extension of the stock relative to the carriage and together with said ring, said horizontal rod means, and said latching means defining the horizontal length of thread cut before the dies open; said stock stop, said horizontal means, said latching means and said screw means being eccentric to, paraxial with, and external of said revoluble body and operable irrespective of the revolving of said body.

HARRY SCHOEPE.